United States Patent

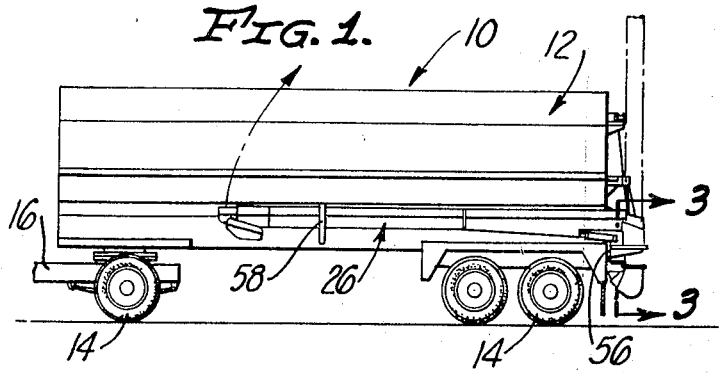
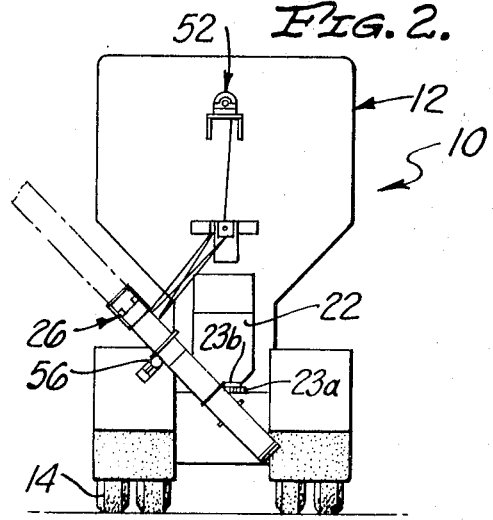
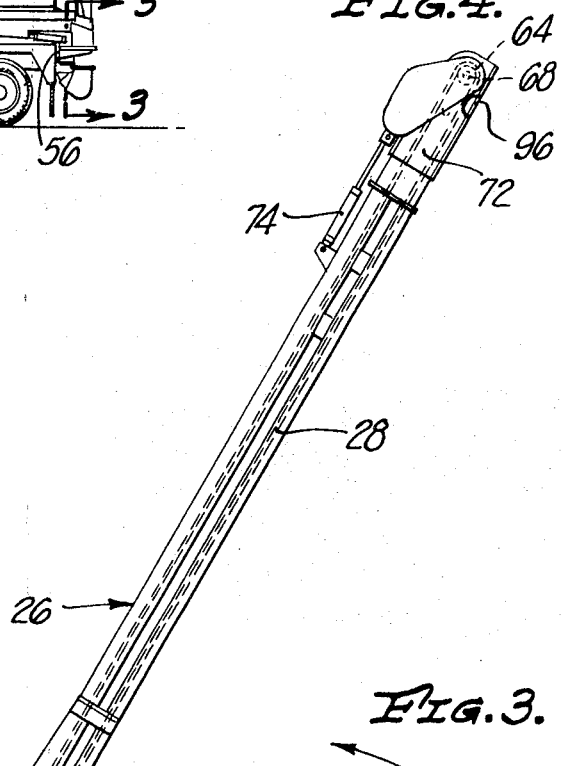
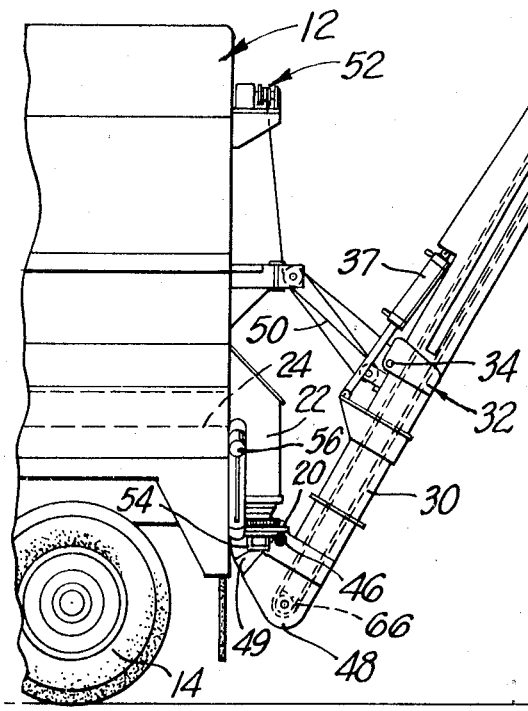
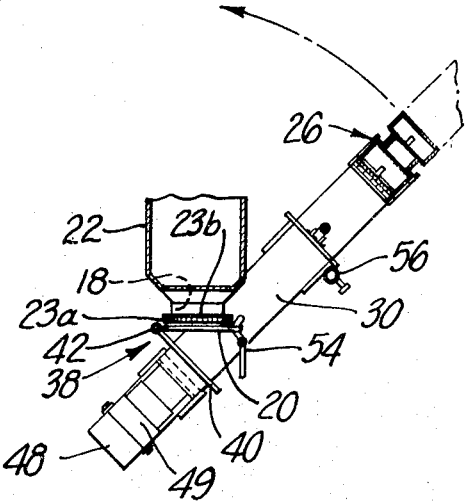
INVENTOR
BERNARD E. CARLSON
BY
*Bernard J. Brown*
ATTORNEY

Carlson

[15] 3,642,155
[45] Feb. 15, 1972

[54] BULK MATERIAL HANDLING VEHICLE AND UNLOADING BOOM THEREFOR

[72] Inventor: Bernard E. Carlson, 1515 W. Arrow Highway, Apt. 18, Upland, Calif. 91786

[22] Filed: Nov. 6, 1969

[21] Appl. No.: 874,141

[52] U.S. Cl. ............................ 214/83.26, 214/521, 198/114, 198/119
[51] Int. Cl. .................................................. B60p 1/36
[58] Field of Search ................... 214/520, 521, 522, 83.26; 198/113, 114, 115, 87, 119, 121

[56] References Cited

UNITED STATES PATENTS

| | | | |
|---|---|---|---|
| 845,078 | 2/1907 | Gritton | 198/113 X |
| 1,031,850 | 7/1912 | Harpstrite | 198/113 |
| 2,783,907 | 3/1957 | Hudgins | 214/522 |
| 2,834,487 | 5/1958 | Gaddis | 198/115 X |
| 3,265,253 | 8/1966 | Niewold | 214/83.26 X |

*Primary Examiner*—Albert J. Makay
*Attorney*—Boniard I. Brown

[57] ABSTRACT

A bulk material handling vehicle having a bulk material storage body and an articulated unloading boom hinged to one end of the body for movement between a retracted travel position wherein the boom is folded against one side of the body and an erect service position wherein the hinged boom sections are aligned. The boom contains an endless conveyor for transporting bulk material upwardly through the boom to the upper outfeed end of the boom and is equipped with means for regulating the conveyor tension and supporting the conveyor at the hinged joint of the boom in such a way as to prevent snagging of the conveyor between the hinged boom sections as the latter are rotated to their aligned positions.

11 Claims, 8 Drawing Figures

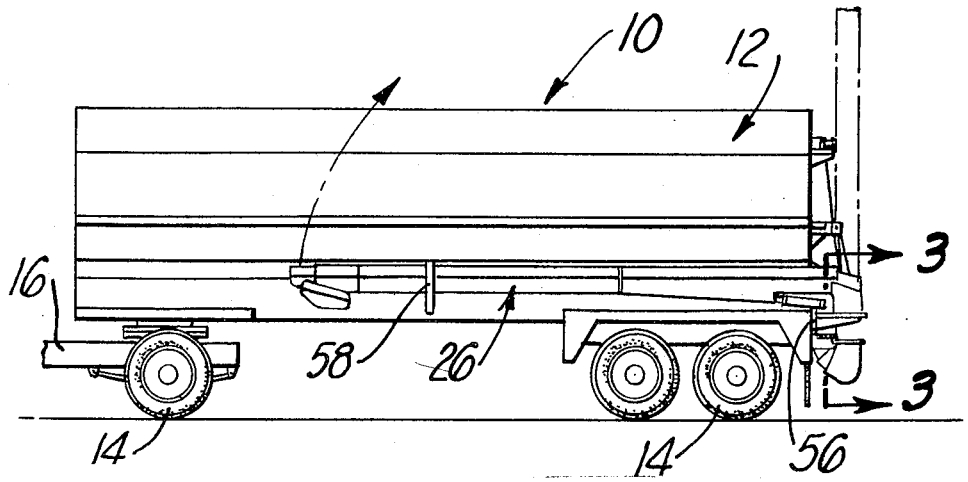

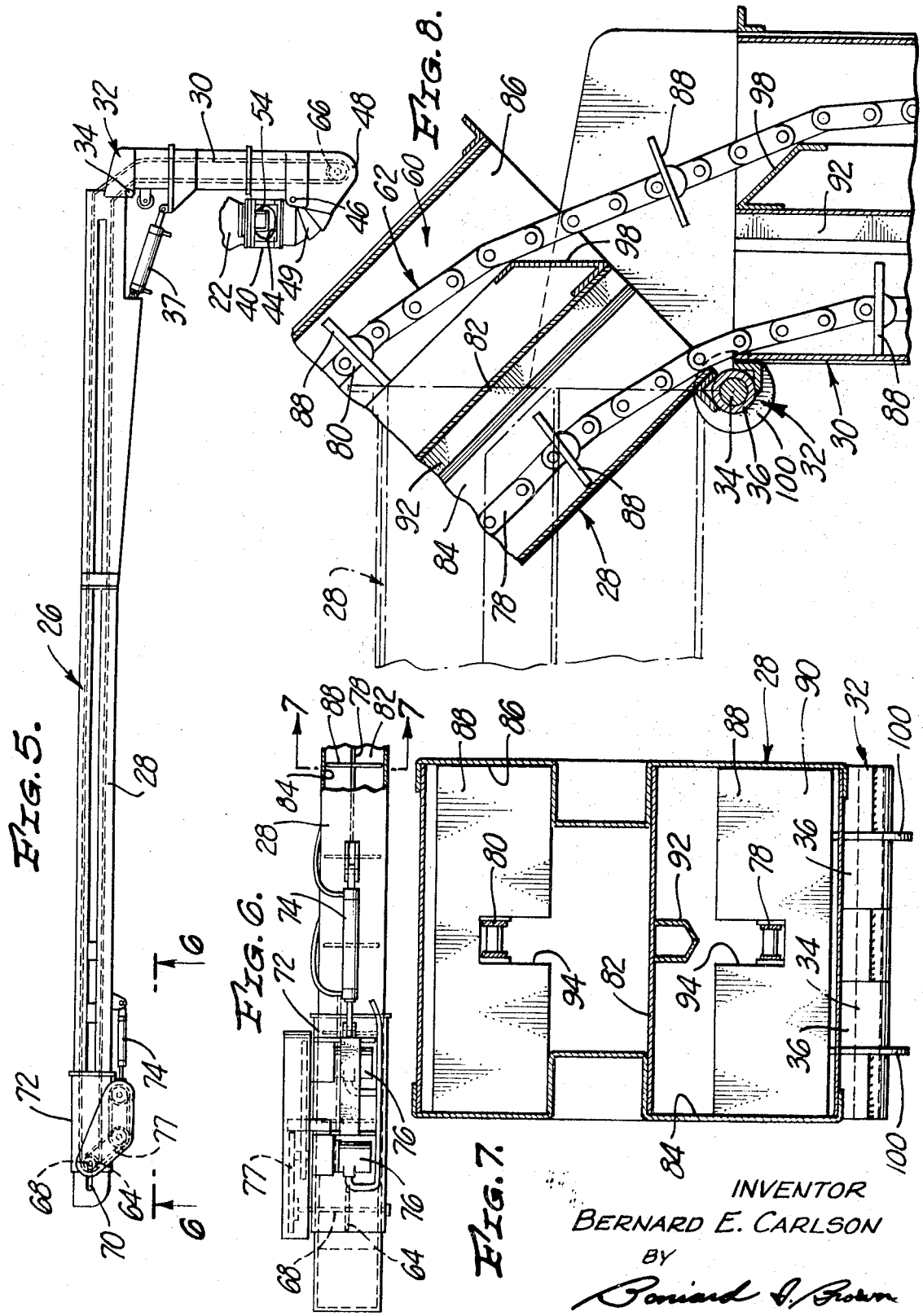

BULK MATERIAL HANDLING VEHICLE AND UNLOADING BOOM THEREFOR

BACKGROUND OF THE INVENTION

1. Field of the Invention

This invention relates generally to the field of bulk material handling and more particularly to a bulk material handling vehicle and an unloading boom therefor.

2. Prior Art

Bulk material handling vehicles are used to transport a wide variety of bulk material, such as grain, feed pellets, and the like, from the field to an unloading station and to unload the materials into a storage container at the station. A conventional vehicle of this type has a bulk material storage body with a discharge opening at one end. Contained within the body are means for moving bulk material through the body to the opening. An unloading boom is pivotally attached to the discharge end of the storage body for receiving bulk material through the discharge opening and includes a conveyor for transporting the material upwardly through the boom to an outfeed opening at the upper end of the boom and then discharging the material through the outfeed opening into the receiving container.

The existing bulk material handling vehicles of this kind suffer from certain deficiencies which this invention overcomes. One deficiency of many vehicles, for example, resides in the fact that the unloading boom, when stowed, often projects some distance beyond the vehicle body and thus presents a hazard during travel of the vehicle along public thoroughfares. Those bulk material handling vehicles which have an articulated boom designed to avoid this deficiency suffer from another disadvantage. This latter disadvantage is that erection of the unloading boom to its unloading or service position requires manual assistance to drag the boom between its travel and service positions and prevent snagging of the boom conveyor between the hinged boom sections as the latter rotate to their aligned positions. Yet another disadvantage of some bulk material handling vehicles involves the method of conveying the bulk material through the unloading boom. The vehicles referred to here are those which have an endless conveyor with a lower run that moves the bulk material upwardly through the boom. This conveying method is unsatisfactory for the reason that a relatively large portion of the bulk material is carried about the upper end of the conveyor and then back downwardly through the conveyor, rather than being discharged through the upper outfeed opening of the boom, particularly when the latter is operated at a relatively steep angle.

SUMMARY OF THE INVENTION

The present invention provides an improved bulk material handling vehicle and unloading boom therefor which avoid the above and other disadvantages of the existing vehicles and booms. According to one feature of the invention, for example, the unloading boom is uniquely constructed and arranged for movement, with great ease and without assistance, between an erect service position and a compact travel position. In this travel position, the boom presents virtually no projection beyond the vehicle body so that the vehicle can travel with complete safety along even heavily traveled public thoroughfares.

Another feature of the invention resides in the unique arrangement of the boom and its conveyor, whereby the boom can be erected without assistance and without danger of snagging of the conveyor in the boom or entrance of the conveyor parts between the hinged boom sections when the latter are rotated to their aligned service positions.

According to another feature of the unloading boom, bulk material is transported upwardly through the boom by the upper run, rather than the lower run, of the boom conveyor in a manner which assures that virtually all of the bulk material transported upwardly to the boom is discharged through the upper outfeed opening of the boom.

BRIEF DESCRIPTION OF THE DRAWINGS

FIG. 1 is a side elevation of a bulk material handling vehicle according to the invention;

FIG. 2 is a rear elevation of the vehicle;

FIG. 3 is an enlarged section taken on line 3—3 in FIG. 1;

FIG. 4 is an enlarged fragmentary side elevation of the rear end of the vehicle illustrating the unloading boom of the vehicle in its erect service position;

FIG. 5 is an enlarged fragmentary detail of the unloading boom per se illustrating the latter folded to its travel position;

FIG. 6 is an enlarged section taken on line 6—6 in FIG. 5;

FIG. 7 is an enlarged transverse section through the unloading boom taken on line 7—7 in FIG. 6; and FIG. 8 is an enlarged fragmentary section through a hinged joint of the unloading boom illustrating the hinged sections of the boom in a partially folded condition.

DESCRIPTION OF THE PREFERRED EMBODIMENT

Referring to the drawings, the illustrated bulk material handling vehicle 10 has a bulk material storage body 12 supported on wheels 14. The vehicle is adapted to be attached to a towing vehicle (not shown) by means of a hitch tongue 16. At the rear end of the storage body 12 is a bulk material discharge opening 18. This discharge opening is contained in and opens downwardly through a horizontal plate 20 on the lower end of a discharge chute or hopper 22 mounted on the rear end of the storage body 12. Hopper plate 20 is rotatable about the vertical axis of the discharge opening 18 and mounts a sprocket 23a about which is trained a sprocket chain 23b driven by a motor (not shown) which may be operated to rotate the hopper plate in either direction. Contained within the storage body 12 is a conveyor 24 which moves bulk material rearwardly through the body to the hopper 22. The bulk material then falls by gravity downwardly through the hopper and the discharge opening 18.

At the rear end of the storage body 12 is a generally tubular unloading boom 26. This boom is movable between its folded travel position illustrated in solid lines in FIG. 1 and in FIG. 5 and its erect service position illustrated in FIG. 4. Boom 26 has an upper section 28 and a lower section 30 pivotally joined by a hinge 32. This hinge has a hinge axis extending transversely of the boom and includes a hinge pin 34 extending through spaced bearing sleeves 36 on the boom sections. Hinge 32 permits rotation of the upper boom section 28 relative to the lower boom section 30 between its aligned service position of FIG. 4 and its folded travel position of FIG. 5. A hydraulic linear actuator 37 is pivotally connected between the boom sections for rotating the upper section between its folded and aligned positions relative to the lower section.

The lower end of the lower boom section 30 is mounted on the rear end of the storage body 12 by a second, compound hinge means 38 having a first hinge axis extending longitudinally of the body and a second hinge axis normal to the longitudinal hinge axis. Hinge means 38 comprises a hinge plate 40 which is attached by a pivot connection 42 to the hopper plate 20. Extending through the hinge plate is a bulk material infeed opening 44. The axis of the pivot connection 42 is the longitudinal hinge axis of the hinge means 38 and is located at one side of the discharge and infeed openings 18, 44 approximately in the plane of the hopper plate 20 and the hinge plate 40. The hinge plate 40 is rotatable relative to the hopper plate 20 between the retracted travel position of FIG. 3, when the plates are separated, and the unloading position of FIG. 4, wherein the plates abut and the discharge and infeed openings are disposed in confronting aligned relation. The lower end of the lower boom section 30 is attached to the hinge plate 40 by a second pivot connection 46 of the hinge means 38. The axis of the hinge connection 46 is the second or normal hinge axis of the hinge means 38, referred to earlier, and extends normal to the hinge axis (longitudinal axis) of the pivot connection 42. The axis of the hinge connection 46 parallels the hinge plate 40. The pivot axis of the hinge connection 32 between the boom sections 28, 30 parallels the pivot axis of the hinge connection 46.

The lower end of the lower boom section 30 constitutes a boot 48. This boot is connected to the hinge plate 40 by means of a telescoping elbow 49. For this description, it will be understood that the lower end of the lower boom section 30 communicates to the infeed opening 44 through the boot 48 and the telescoping elbow 49.

The hinge means 32 and 38 are arranged to permit movement of the unloading boom 26 between its service and travel positions. In the service position of the boom, the hinge plate 40 seats flat against the hopper plate 20, the boom sections 28, 30 are aligned, and the boom extends in an upwardly sloping angle from the rear end of the storage body 12, as shown in FIG. 4. A cable 50 extends between the boom and a winch 52 on the vehicle body 12 and is trained about pulleys on the body and boom for supporting the boom in its service position. Winch 52 is operable to selectively reel the cable in and out for raising and lowering the boom about its pivot connection 46. A releasable lock 54 is provided for locking the hinge plate 40 to the hopper plate 20 when the boom occupies its service position.

It will be understood from the foregoing description that when the boom occupies its service position, bulk material may pass from the storage body 12 of the vehicle through the discharge opening 18, the infeed opening 44, and the telescoping elbow 49 into the boot 48 on the lower end of the lower boom section 30. When the boom is thus in its service position, the hopper plate 20 may be driven in either direction of rotation about its vertical rotation axis by the sprocket chain 23b to swing the boom from side to side of the vehicle.

The boom 26 is lowered to its travel position by releasing the hinge plate latch 54 and operating the winch 52 to unreel the cable 50 so as to permit the boom to swing laterally of the vehicle about the boom hinge plate pivot connection 42 to the position of FIG. 2. In this position, the lower boom section 20 rests laterally against a fixed boom support 56 on the vehicle. Preferably, means are provided for releasably locking the boom to the support 56. After contact of the boom with the support, the hydraulic linear actuator 37 is operated to swing the upper boom section 28 forwardly about its hinge pin 34 to a horizontal position along one side of the storage body 12. Mounted on this side of the body is a cradle 58 for supporting the boom in its travel position. Preferably, means are provided for releasably locking the upper boom section in the cradle. The boom is erected to its service position by reversing the boom lowering procedure outlined above.

Contained within the boom 26 is a conveyor 60 for transporting upwardly through the boom the bulk material which enters the lower boot 48 of the boom from the storage body 12. Conveyor 60 comprises an endless conveyor member 62, in this instance a sprocket chain, trained about rollers or sprockets 64 and 66 rotatably mounted in the upper and lower ends of the boom. The lower sprocket is fixed against movement longitudinally of the boom. The upper sprocket has a shaft 68 whose ends extend through longitudinal slots 70 in the sidewalls of the upper boom section 28 and are journaled in bearings carried by a housing sleeve 72 slidable on the upper section. A hydraulic linear actuator 74 is connected between the upper boom section 28 and the sleeve 72 for adjusting the latter, and thereby the upper conveyor chain sprocket 64, lengthwise of the boom. Mounted on the sleeve 72 are a pair of hydraulic motors 76 which are drivably connected to the upper sprocket 64 through a chain transmission 77 for driving the sprocket and thereby the boom conveyor chain 62. As will appear presently, the hydraulic actuator 74 is operated to move the upper chain sprocket 64 lengthwise of the boom to regulate the conveyor chain tension when the upper boom section 28 is rotated to and from its aligned position relative to the lower boom section 30.

Conveyor chain 62 has upper and lower runs 78 and 80 and is driven in a direction to cause upward movement of the upper run through the boom 26. Boom 26 contains an inner partition 82 which divides the interior of the boom into an upper channel 84 containing the upper chain run 78 and a lower channel 86 containing the lower chain run 80. Fixed to the conveyor chain 62 at intervals therealong are conveyor paddles 88. As shown best in FIG. 7, the conveyor chain extends through the approximate center of each paddle so that each paddle extends above, below and to each side of the conveyor chain. As shown best in FIG. 7, the vertical height of the upper boom channel 84 is substantially greater than the height of the conveyor paddles 88, such that a substantial clearance space 90 exists between the upper wall of the upper channel and the upper edges of the paddles currently contained within the channel. The lower boom channel 86, on the other hand, is dimensioned to receive the conveyor paddles 88 with a relatively close fit. Mounted on the upper side of the boom partition 82, in the plane of the conveyor chain 62, is a rail 92. This rail fits within the conveyor chain receiving slots 94 in the conveyor paddles 88 as the latter move upwardly through the upper boom channel 84. Rail 92 serves to block the paddle slots 94 so as to prevent passage of bulk material through the slots. The purpose of the clearance space 90 between the upper wall of the upper boom channel 84 in the upper edges of the conveyor paddles 88 within the channel is to prevent wedging of relatively large chunks of bulk material, such as feed pellets, between the upper channel wall and the paddles.

At the upper end of the upper boom section 28 is a bulk material outfeed opening 96. This outfeed opening opens through the lower wall of the upper boom section, directly below the upper boom sprocket 64. The lower end of the boom partition 82 terminates a short distance from the lower boom sprocket 66. The upper end of the partition terminates a short distance from the upper boom sprocket 64. As shown best in FIG. 8, the partition 82 and the rail 92 are split at the hinge connection 32 of the upper and lower boom sections 28, 30.

In operation of the bulk material handling vehicle 10, the unloading boom 26 is erected to its service position of FIG. 4, and the conveyor 24 within the storage body 12 and the conveyor 60 within the unloading boom are operated. Conveyor 24 moves bulk material rearwardly through the storage body into the hopper 22. The material then falls by gravity downwardly through the hopper, the discharge opening 18, the infeed opening 44, and the telescoping elbow 49 into the boot 48 at the lower end of the boom. The conveyor paddles 88 on the boom conveyor chain 62 pick up the bulk material from the boot as the paddles travel around the lower boom sprocket 66 and then transport the bulk material upwardly through the boom to the outfeed opening 96 at the upper end of the boom. The paddles then return to the lower end of the boom to repeat the process.

As noted earlier, one feature of the invention resides in the fact that the unloading boom 26 and its conveyor 60 are arranged to discharge through the boom outfeed opening 96 virtually all of the bulk material to transport it upwardly through the boom by the conveyor. In this regard, it will be recalled that the boom conveyor chain 62 is driven in a direction such that its upper run 78 moves upwardly through the boom. Accordingly, bulk material is transported upwardly through the upper channel 84 of the boom by the conveyor paddles 88 on the upper sprocket chain run 78. As these paddles travel around the upper boom sprocket 64, the paddles effectively impel the bulk material outwardly from the boom through its outfeed opening 96. As a consequence, virtually one of the bulk material is retained by the paddles as the latter enter and return to the lower end of the boom through the lower boom channel 86.

According to another feature of the invention, the unloading boom 26 and its conveyor 60 are uniquely constructed and arranged to prevent snagging of the conveyor within the boom or between the abutting edges of the boom sections 28, 30 as the latter rotate from their folded positions, through their partially folded positions in FIG. 8, to their aligned positions of FIG. 4 during erection of the boom to its service position. This feature of the invention is accomplished, in part, by operating the hydraulic actuator 74 on the upper end of the boom to regulate the tension in the conveyor chain 62 during rotation of the upper boom section 28 to its aligned position relative to the lower boom section 30 in such a way as to prevent excessive slack from developing in the chain. In this regard, it will be apparent that during folding of the upper boom section 28 to its travel position, one of the boom sprockets, in this instance the upper sprocket 64, must be moved longitudinally toward the other sprocket to compensate for the effective increase in the center distance between the two sprockets and thereby prevent breakage of the conveyor chain 62. Conversely, during subsequent unfolding rotation of the upper boom section 28 to its aligned service position relative to the lower boom section 30, the effective center distance between the boom sprockets 64, 66 decreases so that slack tends to develop in the conveyor chain 62. This slack, if not removed, would result in disengagement of the chain from its sprockets and in entrance of the chain or its conveyor paddles 88 between the abutting ends of the boom sections, thus preventing complete closure of the sections. Accordingly, during such unfolding rotation of the upper boom section, it is necessary to move the upper boom sprocket 64 in the opposite direction, away from the lower sprocket. To these ends, the hydraulic actuator 74 in the upper end of the unloading boom 26 is operated to move the upper boom sprocket 64 downwardly toward the lower sprocket during folding of the boom to its travel position and to move the upper sprocket upwardly away from the lower sprocket during unfolding of the boom to its erect service position. The actuator is thus operated in such a way as to maintain a substantially constant tension in the sprocket chain and thereby prevent both breakage of the chain during folding of the boom and entrance of the chain or its conveyor paddles 88 between the abutting ends of the boom sections during erection of the boom.

The antijamming feature of the invention under discussion is aided by providing the adjacent ends of the two boom rail sections 92 with inclined ramp surfaces 98, as best illustrated in FIG. 8. These ramp surfaces serve to cam the upper run 78 of the sprocket chain 62 and the conveyor paddles 88 thereon upwardly from between the rail sections during rotation of the upper boom section 28 to its aligned service position. Thus, the inclined ramp surfaces 98 on the rail sections prevent the conveyor chain and conveyor paddles from blocking movement of the rail sections together during rotation of the upper boom section to its aligned position.

A further antijamming aid of the boom resides in guides 100 which are mounted on the boom hinge pin 34 to engage and support the lower run 80 of the conveyor chain 62 during rotation of the upper boom section to its aligned position. These guides, which are shown as discs or wheels, prevent the lower run of the chain from entering between the adjacent lower abutting edges of the boom sections and thereby blocking closure of the sections when the upper boom section 28 is rotated to its aligned position. Obviously, the guides 100 may have other shapes than circular and, if desired, only one guide may be provided.

What is claimed as new in support of Letters Patent is:

1. A bulk material handling vehicle comprising:
  a bulk material storage body having a bulk material discharge opening at one end, and means for moving bulk material through said body to said opening,
  a generally tubular bulk material unloading boom including upper and lower sections, and first hinge means pivotally joining said sections on a first transverse hinge axis of said boom,
  second hinge means pivotally mounting the lower end of said lower boom section on said one end of said body on a second hinge axis extending longitudinally of said body and a third hinge axis parallel to said first axis,
  said boom having a service position wherein said boom sections are longitudinally aligned and said boom extends at an upwardly sloping angle from said one end of said body with said first and third axes in a generally horizontal attitude, and said boom being movable to a travel position wherein said lower boom section extends laterally toward one side of said body with said first and third axes inclined to the horizontal and said upper boom section extends along said one side of said body generally parallel to the longitudinal axis of the vehicle by initial rotation of the boom toward said one body side about said second axis and subsequent rotation of said upper boom section alongside the body about said first axis,
  means for moving said boom between said positions,
  said boom having a lower bulk material infeed opening which communicates with said discharge opening in said service position and an upper bulk material outfeed opening, and
  means for transporting bulk material upwardly through said boom from said infeed opening to said outfeed opening when said boom occupies its service position.

2. A vehicle according to claim 1 wherein:
  said transporting means comprises an endless conveyor member, rollers at the upper and lower ends of said boom about which said conveyor member is trained, and means for driving said conveyor member endwise, and
  remotely operable means for moving one roller lengthwise of said boom to regulate the tension in said conveyor member during hinging of said upper boom section relative to said lower boom section about said first hinge axis.

3. A vehicle according to claim 1 wherein:
  said transporting means comprises an endless conveyor member having upper and lower runs, and means for driving said conveyor member,
  said boom includes a rail supporting said upper run, said rail being split at said boom hinge means into separate rail sections having adjacent ends at said hinge means,
  said rail ends being beveled to form cam surfaces for camming said upper conveyor run from between said ends during rotation of said upper boom section to its aligned position relative to said lower boom section, and
  said boom further includes guide means on said first hinge axis which engage said lower conveyor run to prevent the latter from entering between the abutting ends of said boom sections during rotation of said upper section to its aligned position relative to said lower section.

4. A vehicle according to claim 3 including:
  rollers at the upper and lower ends of said boom about which said conveyor member is trained, and
  remotely operable means for moving one roller lengthwise of said boom to regulate the tension in said conveyor member during hinging of said upper boom section relative to said lower boom section about said first hinge axis.

5. A vehicle according to claim 1 wherein:
  said boom has a longitudinal partition dividing the interior of said boom into upper and lower channels extending lengthwise of said boom,
  said transporting comprises an endless conveyor member having spaced transverse conveyor paddles, an upper run movable through said upper channel and a lower run movable through said lower channel, and means for driving said conveyor member in a direction to cause upward travel of said upper run through said upper channel, whereby said upper run conveys bulk material upwardly through said boom to said outfeed opening,
  said outfeed opening opens downwardly from the upper end of said boom, whereby the paddles on said upper run impel bulk material through said outfeed opening,
  the height of said upper channel being substantially greater than the height of said paddles to provide clearance between said paddles and the upper wall of said upper channel, and
  said lower channel being dimensioned to receive said paddles with a relatively close fit.

6. A vehicle according to claim 5 wherein:
  said transporting means further comprises rollers at the ends of said boom about which said conveyor member is trained, and remotely operable means for moving one roller longitudinally of said boom to regulate the tension in said conveyor member during hinging of said upper boom section relative to said lower boom section about said first hinge axis.

7. A vehicle according to claim 1 wherein:

said body includes a vertical hopper, and a normally horizontal hopper plate containing said discharge opening and rotatably mounted on the lower end of said hopper for turning on an axis normal to the plate and passing through said discharge opening, said second hinge means comprises a hinge plate containing said infeed opening, a plate hinge pivotally mounting said hinge plate on said hopper plate, and a lower boom hinge pivotally mounting said lower boom section on said hinge plate, the axis of said plate hinge axis is located at one side of said discharge and infeed openings approximately in the planes of said plates and constitutes said second hinge axis, and the axis of said lower boom hinge is normal to said plate hinge axis and parallels said hinge plate and constitutes said third axis, and said boom comprises means connecting said hinge plate and the lower end of said lower boom section and communicating said infeed opening to the lower end of said lower boom section.

8. A vehicle according to claim 7 including:

means for driving said hopper plate in rotation on said vertical axis.

9. A vehicle according to claim 7 including:

means for releasably latching said plates together with said boom in service position.

10. A vehicle according to claim 1 including:

means mounting said lower boom section on said body for swinging of the boom laterally of the vehicle on a generally vertical axis.

11. A vehicle according to claim 1 including:

means for supporting said boom sections in said travel position.

* * * * *